United States Patent
Oh

(10) Patent No.: US 9,340,225 B2
(45) Date of Patent: May 17, 2016

(54) APPARATUS FOR CONTROLLING SOUND VOLUME FOR VEHICLE

(71) Applicant: HYUNDAI MOTOR COMPANY, Seoul (KR)

(72) Inventor: Se Min Oh, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/515,185

(22) Filed: Oct. 15, 2014

(65) Prior Publication Data
US 2015/0158519 A1     Jun. 11, 2015

(30) Foreign Application Priority Data
Dec. 9, 2013    (KR) .................. 10-2013-0152541

(51) Int. Cl.
*B62D 1/04*       (2006.01)
*G05G 1/08*       (2006.01)

(52) U.S. Cl.
CPC ..... *B62D 1/046* (2013.01); *G05G 1/08* (2013.01); *Y10T 74/20516* (2015.01)

(58) Field of Classification Search
CPC .............. G07C 9/00817; G07C 2009/00793; G07C 9/00182; G07C 2009/00849; G07C 2009/00825
USPC ...................................................... 340/12.29
See application file for complete search history.

(56) References Cited

U.S. PATENT DOCUMENTS

| | | | | |
|---|---|---|---|---|
| 5,313,014 A * | 5/1994 | Kosugi | ................. | G10H 1/0091 84/622 |
| 5,721,541 A * | 2/1998 | Repp | .................... | B60Q 1/0082 340/425.5 |
| 5,847,664 A * | 12/1998 | Zamplas | .............. | B60Q 1/0082 340/425.5 |
| 6,246,935 B1 * | 6/2001 | Buckley | ................. | B60K 35/00 340/425.5 |
| 6,327,932 B1 * | 12/2001 | Onodera | .............. | B60Q 1/0082 74/552 |
| 6,418,362 B1 * | 7/2002 | St. Pierre | ............... | B60K 37/06 280/778 |
| 7,313,467 B2 * | 12/2007 | Breed | .................... | G07C 5/008 307/9.1 |
| 7,960,661 B2 * | 6/2011 | Wlotzka | .............. | H01H 25/008 200/14 |
| 8,406,961 B2 * | 3/2013 | Pathak | ................ | G06F 3/03547 340/438 |

FOREIGN PATENT DOCUMENTS

| | | |
|---|---|---|
| JP | 5115581 B2 | 1/2013 |
| KR | 10-2007-0062773 A | 6/2007 |
| KR | 10-2010-0065010 A | 6/2010 |

* cited by examiner

*Primary Examiner* — Mark Blouin
(74) *Attorney, Agent, or Firm* — McDermott Will & Emery LLP

(57) ABSTRACT

An apparatus for controlling sound volume for a vehicle includes a steering wheel remote controller and a head unit. The steering wheel remote controller includes a scroll-type button disposed at a portion of a steering wheel and configured to increase or decrease the sound volume depending on a rotational direction of the button. A counter is configured to count the number of volume variation steps due to rotation of the scroll-type button for a predetermined time and generate a volume signal. A communicator is configured to transmit the volume signal to the head unit.

4 Claims, 2 Drawing Sheets

APPARATUS FOR CONTROLLING SOUND VOLUME FOR VEHICLE

CROSS-REFERENCE TO RELATED APPLICATION

This application claims the benefit of priority to Korean Patent Application No. 10-2013-0152541 filed in the Korean Intellectual Property Office on Dec. 9, 2013, the entire contents of which are incorporated herein by reference.

TECHNICAL FIELD

The present disclosure relates to an apparatus for controlling a sound volume for a vehicle. More particularly, the present disclosure relates to an apparatus of controlling a sound volume using a steering wheel remote controller.

BACKGROUND

In general, a vehicle is equipped with a head unit to provide a multimedia service such as a radio and digital multimedia broadcasting (DMB) through a display unit or a speaker. A steering wheel is provided in the vehicle for a driver to change a driving direction.

In order to provide user convenience, a remote controller has been adapted for controlling various kinds of convenient apparatuses for the driver. The remote controller includes various kinds of function buttons on the steering wheel to control the convenient apparatuses.

For example, the driver may adjust a sound volume of the head unit via a volume button provided on the steering wheel. The remote controller performs a controller area network (CAN) communication with the various kinds of convenient apparatuses.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an apparatus for controlling a sound volume for a vehicle having advantages of preventing a time delay and deterioration of operation sensitivity in a controller area network (CAN) communication environment.

An apparatus of controlling a sound volume for a vehicle may include a steering wheel remote controller and a head unit. The steering wheel remote controller may include a scroll-type button disposed at a portion of a steering wheel and configured to increase or decrease the sound volume depending on a rotational direction of the button. A counter is configured to count the number of volume variation steps due to rotation of the scroll-type button for a predetermined time and generate a volume signal. A communicator is configured to transmit the volume signal to the head unit.

The scroll-type button may increase the volume when the rotational direction is a clockwise direction and decrease the volume when the rotational direction is a counterclockwise direction.

The counter may count the number of volume variation steps by a positive integer value when the scroll-type button rotates in the clockwise direction and count the number of volume variation steps by a negative integer value when the scroll-type button rotates in the counterclockwise direction.

The communicator may be configured to perform a controller area network (CAN) communication.

The head unit may adjust the sound volume depending on the volume signal.

According to the exemplary embodiment of the present invention, a time delay between a time point when the scroll button is rotated and a time point when the sound volume is actually adjusted can be reduced. Further, the sound volume can be adjusted as intended by a driver so that operation sensitivity of the scroll-type button can be improved.

DETAILED DESCRIPTION OF THE EMBODIMENTS

Figure 1:
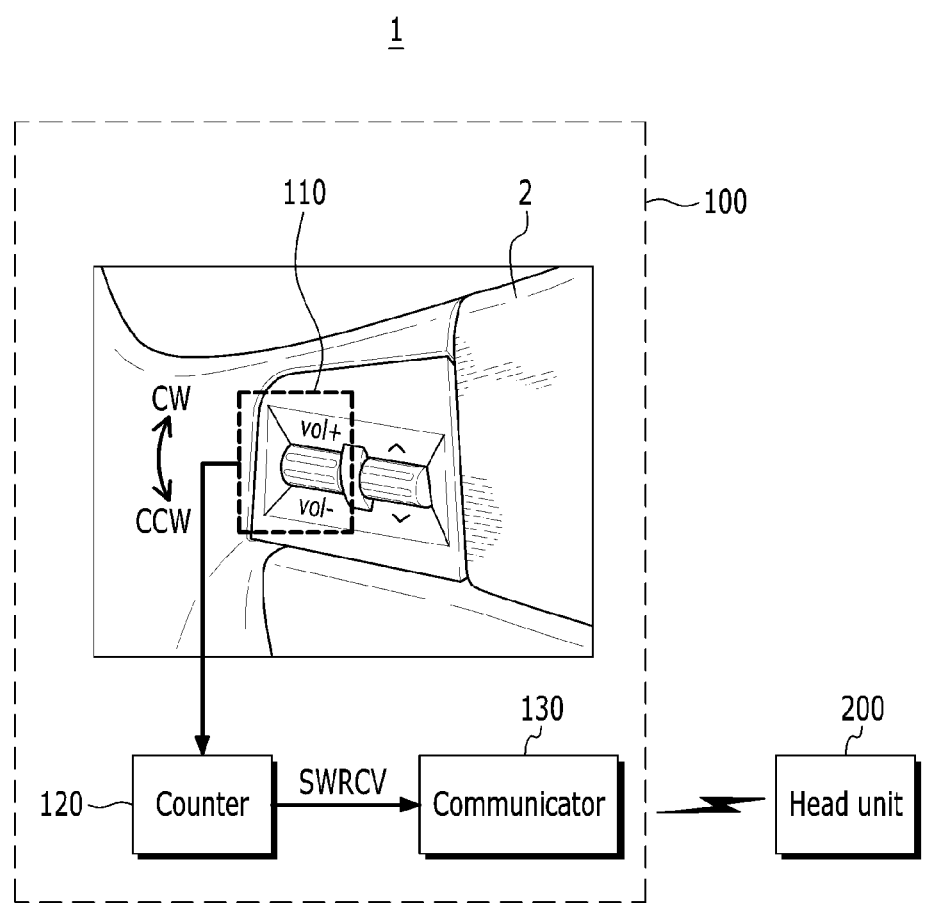
FIG. 1 is a diagram illustrating an apparatus of controlling a sound volume for a vehicle according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, the present invention will be described more fully with reference to the accompanying drawings, in which exemplary embodiments of the invention are shown.

FIG. 1 is a diagram illustrating an apparatus for controlling a sound volume for a vehicle according to an exemplary embodiment of the present invention.

Referring to FIG. 1, an apparatus 1 for controlling a sound volume for a vehicle according to an exemplary embodiment of the present invention may include a steering wheel remote controller 100 and a head unit 200. The steering wheel remote controller 100 is disposed at a steering wheel 2.

The steering wheel remote controller 100 may include a scroll-type (encoder-type) button 110, a counter 120, and a communicator 130.

The scroll-type button 110 may operate as a volume button to increase or decrease the sound volume by rotating the button 110. For example, the scroll-type button 110 increases the sound volume step by step when the button 110 is rotated in a clockwise direction and decreases the sound volume step by step when the button 110 is rotated in a counterclockwise direction.

The counter 120 counts the number of volume variation steps of the scroll-type button 110 for a predetermined time (e.g., 100 ms) by an integer value. The counter 120 generates a volume signal SWRCV corresponding to the integer value.

Herein, the volume signal SWRCV may be eight-bit data and may represent volume up steps or volume down steps. For example, 0x01 to 0x7F may represent volume up steps, 0x80 to 0xFE may represent volume down steps, 0x0 may represent a reserve step, and 0xFF may represent an invalid step. The volume variation steps according to an exemplary embodiment of the present invention may be set as forty-five steps. That is, the sound volume varies during the forty-five steps from a minimum volume to a maximum volume and during the forty-five steps from the maximum volume to the minimum volume. Further, the bit number of the volume signal SWRCV can be varied in accordance with the number of volume variation steps.

The counter 120 counts the number of volume variation steps by a positive integer value when the scroll-type button 110 rotates in the clockwise direction, and counts the number of volume variation steps by a negative integer when the scroll-type button 110 rotates in the counterclockwise direction.

For example, the counter 120 counts the number of volume variation steps to be '+5' when the scroll-type button 110 is rotated in the clockwise direction by five steps, and counts the number of volume variation steps to be '−2' when the scroll-type button 110 is rotated in the counterclockwise direction by two steps. In other words, when the scroll-type button 110 rotates in the clockwise direction by five steps and in the counterclockwise direction by two steps for the predetermined time, the counter 120 counts the number of volume variation steps to be '+3' and generates the volume signal SWRCV that corresponds to the '+3'.

The communicator 130 transmits the volume signal SWRCV to the head unit 200 by performing controller area network (CAN) communication. The head unit 200 adjusts the sound volume depending on the volume signal SWRCV.

Figure 2:
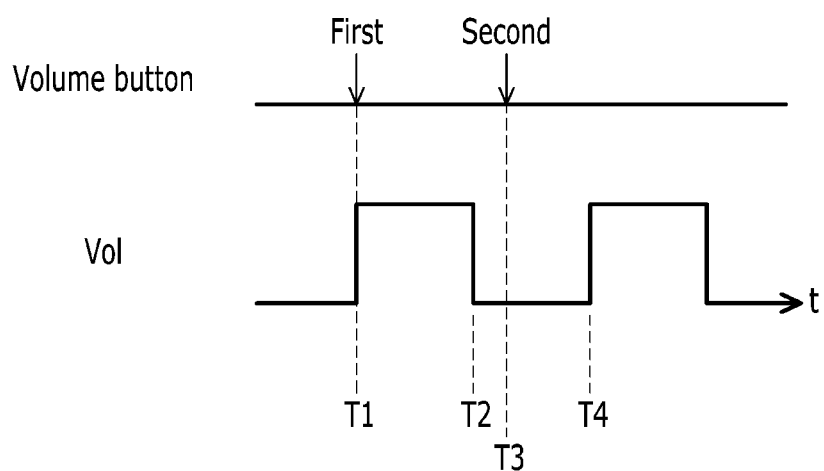
FIG. 2 is a diagram illustrating a signal transmitted from a conventional steering wheel remote controller to a head unit in a CAN communication environment.

FIG. 2 is a diagram illustrating a signal transmitted from a conventional steering wheel remote controller to a head unit in a CAN communication environment.

Referring to FIG. 2, differing from the above-described exemplary embodiment, in a case where the number of volume variation steps is not counted, a conventional steering wheel remote controller generates a pulse signal Vol whenever a volume button is operated, and transmits the pulse signal Vol to the head unit. The head unit adjusts a sound volume whenever the pulse signal is received.

For example, when the volume button is operated at a time T1, the conventional steering wheel remote controller generates a first pulse signal Vol and transmits the first pulse signal Vol to the head unit. In the CAN communication environment, since a minimum transmission time (e.g., 60 ms) is required, the head unit may receive the first pulse signal at time a T2. That is, the sound volume of head unit is increased by one step at time a T2.

When the volume button is a push-type button in the related art, it is inconvenient for a driver to promptly press the volume button. Since the number of times at which the push-type button is pressed for a predetermined time is limited, it is possible to ensure the minimum transmission time for transmitting the pulse signal Vol whenever the push-type button is pressed.

When the volume button is a scroll-type button in the related art, since the driver may quickly rotate the scroll-type button for the predetermined time, it is hard to ensure the minimum transmission time for transmitting the pulse signal Vol whenever the scroll-type button is rotated.

When the volume button is secondarily operated at a time T3, the head unit receives a second pulse signal Vol at a time T4 due to the transmission time of the first pulse signal Vol. That is, a time delay occurs between the time T3 (the time that the volume button is operated) and the time T4 (the time that a sound volume of the head unit is adjusted).

For example, when the volume button is rotated in the clockwise direction by five steps and is rotated in the counterclockwise direction by two steps in 200 ms, the pulse signal is transmitted seven times (i.e., a volume up signal is transmitted five times and a volume down signal is transmitted two times). If the minimum transmission time is 60 ms, 420 ms is required to sequentially transmit the pulse signals. That is, the volume button is operated within 200 ms, but 420 ms is required for finishing the volume control.

Further, since the volume button is rotated in the clockwise direction by five steps and is rotated in the counterclockwise direction by two steps, the sound volume should be increased by three steps. However, since the pulse signal is transmitted three times in 200 ms, the volume up signal is transmitted two times and the volume down signal is transmitted one time due to timing of the CAN communication. That is, since the sound volume is increased by one step, but not three steps that is intended by the driver, operation sensitivity of the volume button is deteriorated.

However, the steering wheel remote controller 100 according to the exemplary embodiment of the present invention counts the number of volume variation steps of the scroll-type button 110 rotation for the predetermined time by the integer value and transmits the volume signal SWRCV corresponding to the integer value to the head unit 200, and thus, even though the scroll-type button 110 is rapidly rotated for the predetermined time, the volume signal SWRCV is transmitted in real time without a delay in time thereof.

According to the exemplary embodiment of the present invention, a time delay between a time point when the scroll-type button 110 is rotated and a time point when the sound volume is actually adjusted can be reduced. Further, the sound volume can be adjusted as intended by the driver so that operational sensitivity of the scroll-type button 110 can be improved.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An apparatus of controlling a sound volume for a vehicle, comprising:
   a steering wheel remote controller; and a head unit,
   wherein the steering wheel remote controller includes: a scroll-type button disposed at a portion of a steering wheel and configured to increase or decrease the sound volume depending on a rotational direction of the scroll-type button; a counter configured to count the number of volume variation steps due to rotation of the scroll-type button for a predetermined time and to generate a volume signal; and a communicator configured to transmit the volume signal to the head unit,
   wherein the scroll-type button increases the sound volume when the rotational direction is a clockwise direction and decreases the sound volume when the rotational direction is a counterclockwise direction, and
   wherein the counter counts the number of volume variation steps by a positive integer value when the scroll-type button rotates in the clockwise direction and counts the number of volume variation steps by a negative integer value when the scroll-type button rotates in the counter-clockwise direction.

2. The apparatus of claim 1, wherein the communicator is configured to perform controller area network (CAN) communication.

3. The apparatus of claim 1, wherein the head unit adjusts the sound volume depending on the volume signal.

4. The apparatus of claim 1, wherein the volume signal is eight-bit data and represents volume up steps or volume down steps.

* * * * *